(12) United States Patent
Miranda et al.

(10) Patent No.: US 6,457,975 B1
(45) Date of Patent: Oct. 1, 2002

(54) METHOD AND APPARATUS FOR TRAINING A PERSON TO LEARN A COGNITIVE/FUNCTIONAL TASK

(75) Inventors: Fernando Miranda, San Francisco, CA (US); Michael Shore, San Francisco, CA (US); Robin Fried, Berkeley, CA (US)

(73) Assignee: Michael D. Shore, San Francisco, CA (US)

( * ) Notice: Subject to any disclaimer, the term of this patent is extended or adjusted under 35 U.S.C. 154(b) by 0 days.

(21) Appl. No.: 08/871,276

(22) Filed: Jun. 9, 1997

(51) Int. Cl.[7] ............................................. G09B 19/00
(52) U.S. Cl. ..................... 434/236; 434/258; 600/544
(58) Field of Search ............................ 434/258, 247, 434/236; 463/36; 600/544

(56) References Cited

U.S. PATENT DOCUMENTS

| | | | | |
|---|---|---|---|---|
| 4,008,714 A | * | 2/1977 | Silva et al. | 128/2.1 B |
| 4,308,873 A | * | 1/1982 | Maynard | 128/731 |
| 4,332,566 A | * | 6/1982 | Mazeski et al. | 434/178 |
| 4,798,538 A | * | 1/1989 | Yagi | 434/262 |
| 5,213,338 A | * | 5/1993 | Brotz | 273/460 |
| 5,304,112 A | * | 4/1994 | Mrklas et al. | 600/27 |
| 5,460,184 A | * | 10/1995 | Sato et al. | 128/731 |
| 5,474,082 A | * | 12/1995 | Junker | 128/732 |
| 5,529,498 A | * | 6/1996 | Cassily et al. | 434/258 |
| 5,626,145 A | * | 5/1997 | Clapp et al. | 128/731 |
| 5,692,517 A | * | 12/1997 | Junker | 128/732 |
| 5,743,744 A | * | 4/1998 | Cassily et al. | 434/258 |
| 5,884,626 A | * | 3/1999 | Kuroda et al. | 128/630 |

* cited by examiner

*Primary Examiner*—Jessica J. Harrison
*Assistant Examiner*—Chanda Harris (57) ABSTRACT

The present invention provides a method and apparatus for training a person to learn a cognitive/functional task that requires a sequence of decisions and a corresponding sequence of actions. According to a preferred embodiment of the invention, a cognitive/functional task is decomposed into critical elements and non-critical elements. The critical elements have distinguishing features and are essential to the cognitive/functional task. The critical and non-critical elements are presented to a trainee in a predetermined sequence in a simulated environment through, for example, a virtual reality device. The trainee is trained to act in accordance with the critical and non-critical elements presented. Furthermore, a data processing system is used to monitor the actions taken by the trainee in the simulated environment in response to the presented critical and non-critical elements. Moreover, the learning receptivity and learning achievement by the trainee is measured via a brain wave detection device. After a training process is completed, the trainee is tested to perform the complete cognitive/functional task in the simulated environment. If the trainee fails the test, the training process may be modified to adapt to the specific training needs of the trainee. The present invention finds many applications in various fields where training people to perform cognitive/functional tasks is needed, such as in rehabilitating brain-damaged persons, and industrial training, etc.

21 Claims, 5 Drawing Sheets

METHOD AND APPARATUS FOR TRAINING A PERSON TO LEARN A COGNITIVE/FUNCTIONAL TASK

BACKGROUND OF THE INVENTION

Traditionally, when one needs to obtain knowledge in a particular field or learn a skill, one can generally learn it from a teacher, through a video tape, or through a personal computer. For example, there are numerous video tapes and CD-ROMs for teaching people foreign language skills and other subjects, such as mathematics, etc. The results of learning through these means are generally acceptable when the skill does not involve performing a cognitive/functional task that requires a sequence of decisions and a corresponding sequence of actions. For example, to train a child or a mentally disabled person to cross a street under different traffic conditions, a video tape would not be effective since the person cannot take appropriate actions when a street under a particular traffic condition is presented to him in the form of a video image. Thus, if the video tape shows a street with a green pedestrian light, the trainee will not learn to decide upon a course of action such as is involved in crossing that street under that condition since the street is not physically present, and their decision/actions have no influence on the observed scenario. Therefore, the effectiveness of this type of training is discounted. On the other hand, to have a teacher to train each trainee in all actual environments would be too costly.

Therefore, there exists a need for an improved training tool that trains a trainee in a more effective manner and that allows the trainee to learn to make critical decision and then to safely practice appropriate actions in a simulated environment.

SUMMARY OF THE INVENTION

The present invention provides a method and apparatus for training a person to learn a cognitive/functional task that requires a sequence of decisions and a corresponding sequence of actions.

According to a preferred embodiment of the invention, a cognitive/functional task is decomposed into critical elements and non-critical elements. The critical elements have distinguishing features that are essential to the cognitive/functional task. The critical and non-critical elements are presented to a trainee in a predetermined sequence in a simulated environment through, for example, a virtual reality device. The critical elements may be presented separately and in combination, and then the critical and non-critical elements may be presented in combination.

According to a preferred embodiment of the invention, the trainee is trained to act in accordance with the critical and non-critical elements presented. Furthermore, a data processing system is used to monitor the actions taken by the trainee in the simulated environment in response to the presented critical and non-critical elements. Moreover, the learning receptivity by the trainee is measured. According to a preferred embodiment of the invention, the learning receptivity is measured by measuring fatigue and attention levels of and learning achievement by the trainee via a brain wave detection device. The detection device detects brain wave signals of the trainee. If the brain wave signals are in a particular stable state, it indicates that the person has a low level of fatigue (absent theta activity and/or stable theta). Another brain wave, alpha is monitored as well. When alpha wave is detected and/or presented to a greater degree, (i.e., there is an altered occurrence to a statistically likely threshold over the current detection level of the particular wave assessed), the person is not paying attention. If the brain wave signals are in low theta and alpha, it indicates that the person has a low level of fatigue and is paying attention. In alternative cases, the training should be temporarily terminated, the trainee should be cued in accord with the particular training level employed and training resumes as learning receptivity is again achieved. Learning achievement is determined by the application of a learning achievement algorithm to the brain wave signals continuously gathered.

According to a preferred embodiment of the invention, a training process may be defined into different levels of complexity for different learning stages and for different trainees. In each level, the critical and non-critical elements are presented in a particular manner. After a training process is completed, the trainee is tested to perform the complete cognitive/functional task in the simulated environment. If the trainee fails the test, the training process may be modified to adapt to the specific training needs of the trainee.

The present invention finds many applications in various fields where training people to perform cognitive/functional tasks is needed, such as in rehabilitating brain-damaged persons, and industrial training, etc.

Other objects and attainments together with a fuller understanding of the invention will become apparent and appreciated by referring to the following description and claims taken in conjunction with the accompanying drawings.

DETAILED DESCRIPTION OF THE PREFERRED EMBODIMENTS

Figure 1:
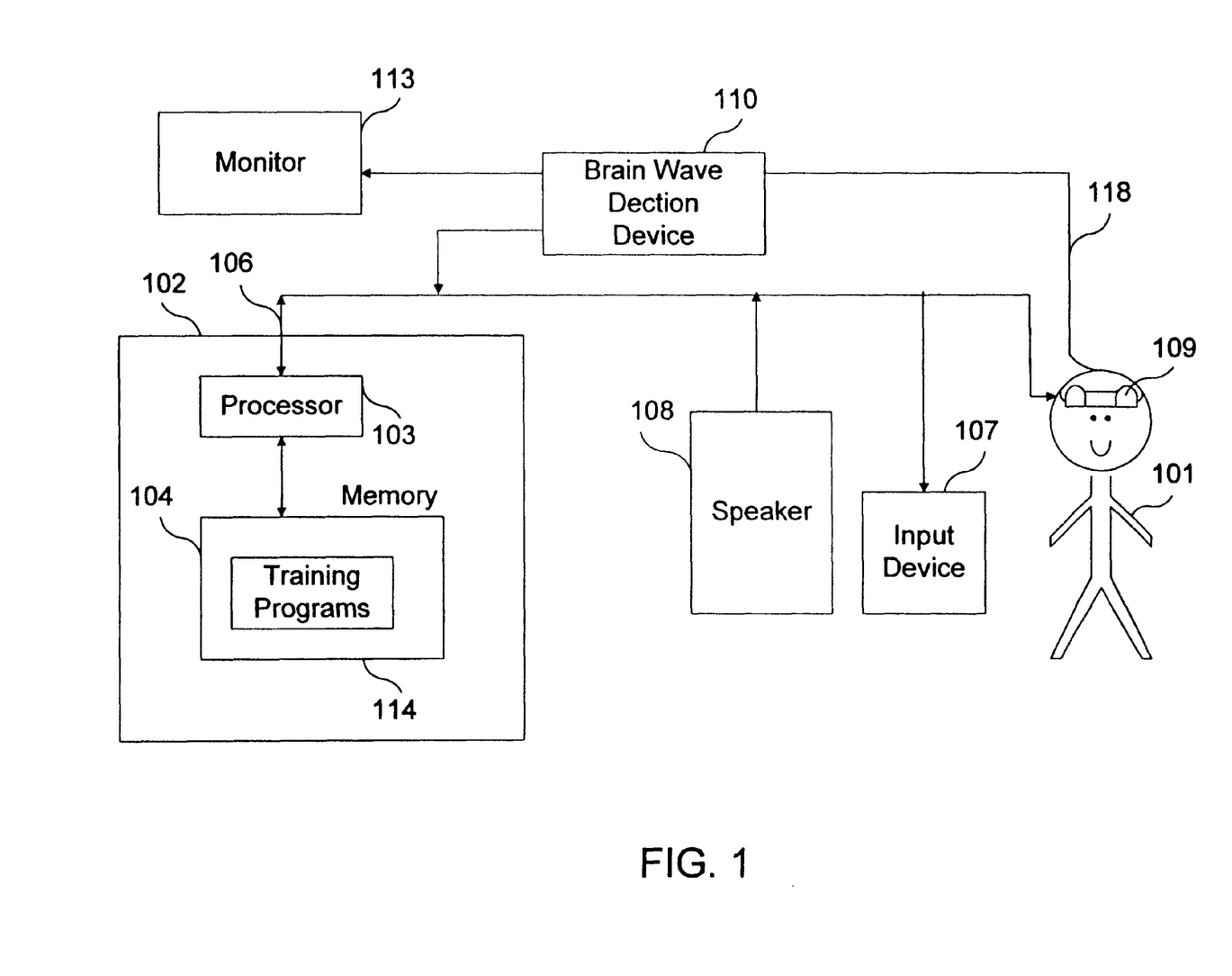
FIG. 1 shows a functional block diagram of a training system according to a preferred embodiment of the invention.

FIG. 1 shows a functional block diagram of a training system for training a trainee 101 in accordance with a preferred embodiment of the present invention. The training system comprises a data processing system 102 including a processor 103 and a memory 104, an input device 107, a speaker 108, a virtual reality device 109, a brain signal detection device 110, and a monitor 113. Input device 107, speaker 108 and virtual reality device 109 are connected data processing system 102 via input/output lines 106. It will be understood by persons of ordinary skill in the art that there are numerous other elements not shown in the figure, such as disk drives, mouses, keyboards, additional memory busses, etc., that can be connected to data processing system 102. Memory 104 includes training software 114 for teaching trainee 101 to learn a cognitive/functional task that requires a sequence of decisions and corresponding sequence of actions. Input device 107 can be a joystick that is used by trainee 101 to simulate actions he would take during a training session. Other input devices may also be used, such as a treadmill for use by the trainee to simulate the action of crossing a street. Virtual reality device 109 is worn by trainee 101. Virtual reality device 109 is a conventional device that displays three-dimensional (3D) images to simulate an actual environment in which the trainee is to be trained to perform a cognitive/functional task.

A cable 118 has one end attached to the head of trainee 101 and the other end connected to a brain wave detection device 110 which is connected to a monitor 113 and data processing system 102 via input/output lines 106. Detection device 110 detects the brain wave signals of the trainee to measure the learning receptivity and learning achievement of the trainee during a learning process. The learning receptivity is represented by the fatigue of and attention by the trainee. Learning achievement is measured by application of the BEAM learning achievement algorithm to standard EEG data, using commercially available EEG measurement equipment. The BEAM learning achievement algorithm is commercially available from B.E.A.M. Inc., Boston, Mass. In a preferred embodiment, an alpha-wave/theta-wave detector is used as detection device 100. Alpha-wave/theta-wave detectors are commercially available and are made by Neuro Cyber Netics, Encino, Calif. Monitor 113 is connected to the output of detection device 110 for displaying the brain wave signals of trainee 101.

Figure 2:
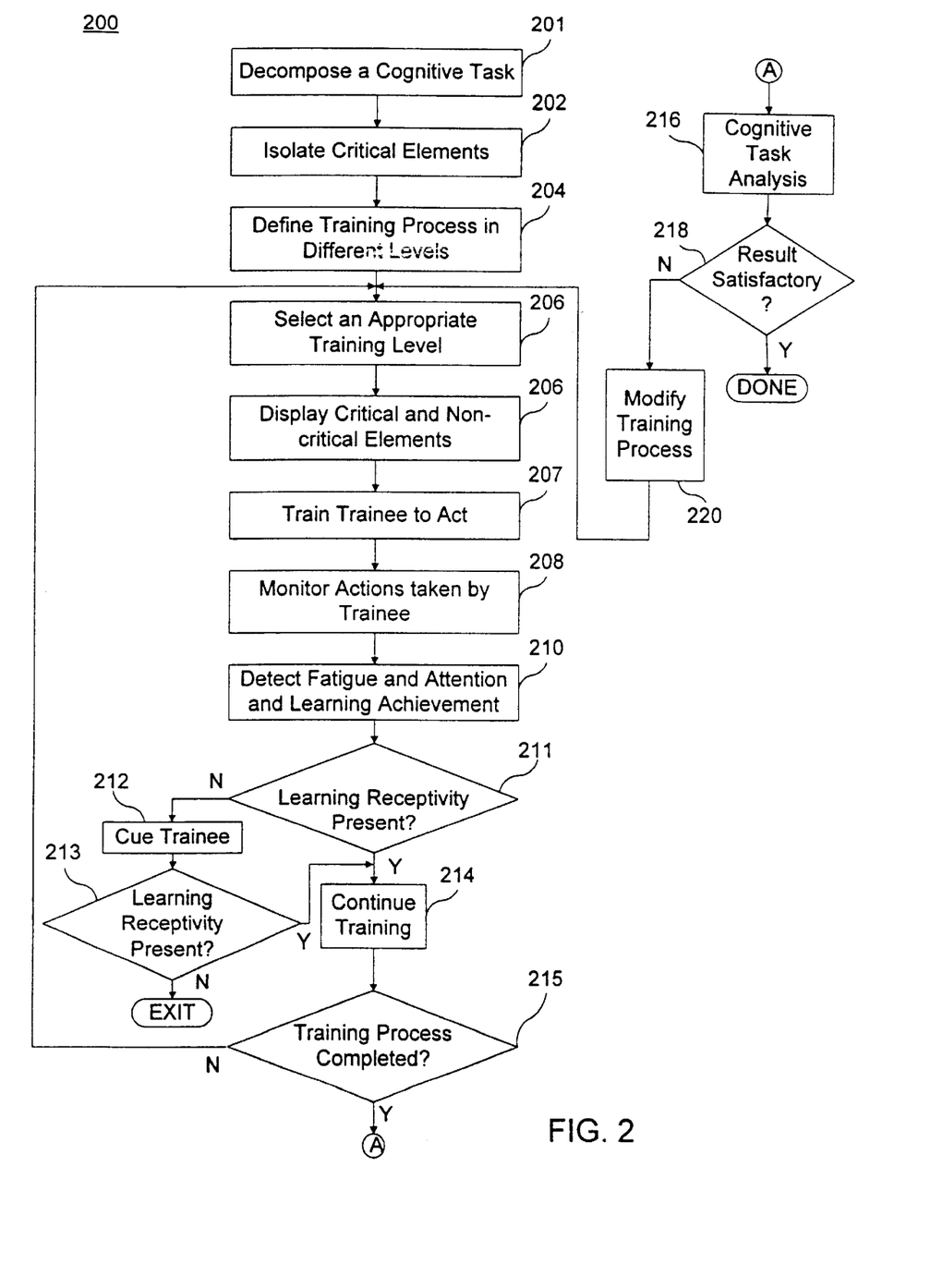
FIG. 2 shows a flowchart illustrating a training methodology according to a preferred embodiment of the invention.

FIG. 2 shows a flowchart illustrating a training methodology 200 for training a person to learn a skill of performing a cognitive/functional task in accordance with a preferred embodiment of the present invention. Methodology 200 is implemented through training program 114 executed by processor 103 in FIG. 1. In accordance with the methodology, a cognitive/functional task is decomposed into critical and non-critical elements (step 201). This step may be performed by training program 114 through commands input by a trainer. Critical elements are those components in a cognitive/functional task that have distinguishing features and are essential to performing the cognitive/functional task the distinguishing features having operative characteristics which demand a certain action on the part of the person. For example, in a process of training a child or a mentally disabled person to cross a street, the critical elements of performing this cognitive/functional task include traffic signs, traffic lights, and moving vehicles since they have distinguishing features and are essential to crossing a street. Trees and buildings are non-critical elements since they do not relate to crossing a street. In another example, in learning the skill of driving a car, the steering wheel, the brake pedal, and the gas pedal are critical elements; the seats and passengers are non-critical elements since they do not relate to the core skills of driving a car. Introduction of the non-critical stimuli elements would represent unnecessary distraction in the early learning period. In later learning periods, these elements are introduced, and the training focuses on the endurance of the core cognitive/functional competence in the presence of distraction.

Once the critical isolated elements of a cognitive/functional task have been mastered (step 202), the training continues, now introducing levels of complexity. Then, the training processes are defined in terms of complexity level (step 204). For example, a particular training process may be defined in three levels of complexity, e.g., low, medium and high. These three levels may be used at different learning stages and for different trainees. In the above example of training a person to cross a street, a low level of complexity in the simulation training environment may be one where only some of the critical elements, such as traffic signs are displayed in a street scene with no cars, busses or sound. The person will be trained to cross the street under these circumstances. A medium level of complexity may add missing features of the simulation training environment such as cars, changing traffic lights, distraction, noise, etc. The person will be trained to cross a street under these traffic conditions. At this level, cognitive demands are increased, and success will require important new skills. A high level of complexity is an important next step towards the real world. In the real world, cars don't always stop at lights and rules are sometimes broken. At a high level complexity, the trainee deals with rule violations, deliberate distractions, and interrupted action plans. Success here requires additional skills.

After the training process is defined, an appropriate level of complexity is selected for training a person (step 206). The selection is based on the background of the trainee. For people with good fundamental skills in a particular cognitive/functional task, a relatively high level of complexity may be selected for the initial training, once it has been demonstrated that the isolated critical features of the target cognitive/functional task are indeed mastered. Next, the critical and non-critical elements relating to the cognitive/functional task are displayed on the virtual reality device (step 206) in accordance with the selected training level. The critical and non-critical elements may be displayed separately and in combination in a predetermined manner. Then, the trainee will be trained by a trainer (not shown) to perform the cognitive/functional task through the use of the input device under various conditions (step 207).

In the above example of learning to cross a street, for instance, only traffic signs or lights are initially displayed in a street scene by the virtual reality device. Then moving vehicles are added to the street scene. Next, non-critical elements such as trees and buildings are also added to the street scene.

Under the various traffic conditions, the trainee will be trained to cross the street. During the training process, actions takes by the trainee via the input device are monitored through the data processing system (step 208). As the trainee completes the task, the time spent in each simulation is monitored and success, as measured by freedom from errors, is recorded. Simulated natural consequences are generated for errors. In the example of crossing a street, if the trainee is hit by a moving vehicle when he is crossing the street, a beep is generated indicating an error. Over individual and multiple sessions, cumulative errors are stored in the computer and error rates can be reviewed. Thus, actual performance evaluation of real life simulation activities is possible. By altering the level of complexity, monitoring errors and progressively challenging the trainee to reach for the highest level of independence, a trainer can know for sure if the training within a sophisticated training environment is effective. The ability of the training system to produce performance reports enhances a trainer's ability to demonstrate a trainee's progress. Additionally, cognitive/functional tasks are linked into combinations such as in a scenario of crossing a street to enter a store, and then to shop in the store. The training system presents the trainee with this complex scenario, and then monitors performance of the trainee in their recreation of this combination of cognitive/functional tasks.

In methodology 200, fatigue of and attention by the trainee are also detected (step 210). At this step, the learning receptivity of the trainee is measured by brain wave detection device 110. If the brain wave signals from the trainee are detected as being in low theta and low alpha, it indicates low fatigue and high attention. On the other hand, if the brain wave signals are detected otherwise, then it indicates poorer learning receptivity.

Based on the recorded performance results and the detected fatigue and attention levels (and learning achievement), the learning receptivity is measured (step 211). Then at step 214, training continues. If high fatigue and low attention are detected as compared to the levels at the beginning of the training session, this indicates that the trainee is probably too tired to learn the skill at this time and the program will cue the trainee to refocus (step 212). Then learning receptivity is again measured (step 213). If refocus occurs, training continues (step 214). If refocus does not occur, the system will exit. If, however, low fatigue and high attention are detected, the training will continue, irrespective of the performance results. Then, at step 215, whether or not the training process is completed is determined and demonstrated by both performance success and brain wave signals indicative of learning achievement. If not, the training process continues at step 206. Learning achievement is determined by the application of for example, the BEAM learning achievement algorithm to the brain wave signals continuously gathered. Other appropriate learning achievement algorithms can also be used.

According to the methodology of the invention, a person is first trained to achieve small goals. After a cognitive/functional goal is successfully achieved by the person, larger goals (cognitive/functional tasks in combination) are presented for training the person, until the ultimate goal is successfully achieved by the trainee. An ultimate goal is determined a priori by the trainer and may be such a combination of cognitive/functional tasks as is involved in leaving an apartment, driving to a store, shopping, returning to the apartment, and preparing a meal. Alternatively, assessing the repair needs of a non-functional engine of a vehicle, ordering and receiving parts and repairing the engine would be another such ultimate goal. Monitoring learning achievement becomes critical at this juncture. With both successful task accomplishment and learning achievement detected, the trainee has demonstrated learning of the desired skill which could be confirmed in the following test phase. If task successfully occurs without learning achievement detected, the likelihood of random accomplishment without true learning arises. The task would be repeated until such time as both successful performance and learning achievement are both expressed.

After the ultimate goal is successfully achieved by the trainee, i.e., after the trainee has been trained to perform combination of cognitive/functional tasks represented by the ultimate goals, a test is given to the trainee to analyze his ability to perform the task in the simulated environment (step 216). In the example of crossing a street described above, the trainee would be required to go to a grocery store that is several blocks away from his home and then come back. Precedent to the test, the trainee would be presented with the desired target performance by either the trainer and/or by the system. The analysis results are determined based on the error rates in the process of performing the task (step 218), the time to complete the task, and the degree of optimization realized by the trainee as defined by the relationship of their performance to the target performance that had been originally presented to them by the trainer and/or by the system. If the trainee performs well, the training is over, and the trainee has learned the skill to perform the cognitive/functional task. If, however, the results of the analysis is not satisfactory, the training process will be modified to adapt the trainee's individual needs (step 220). For example, in the example of crossing a street, if the trainee fails to stop when a red pedestrian light is on, he will be repeatedly trained on discriminating among the different colors of the light. He will also be trained to take the appropriate actions when the light is at each color. The training process will continue in a similar manner as above until the ultimate goal is achieved and the trainee's ability to perform the cognitive/functional task is demonstrated as measured by the successful performance of the cognitive/functional task.

Figure 3A:
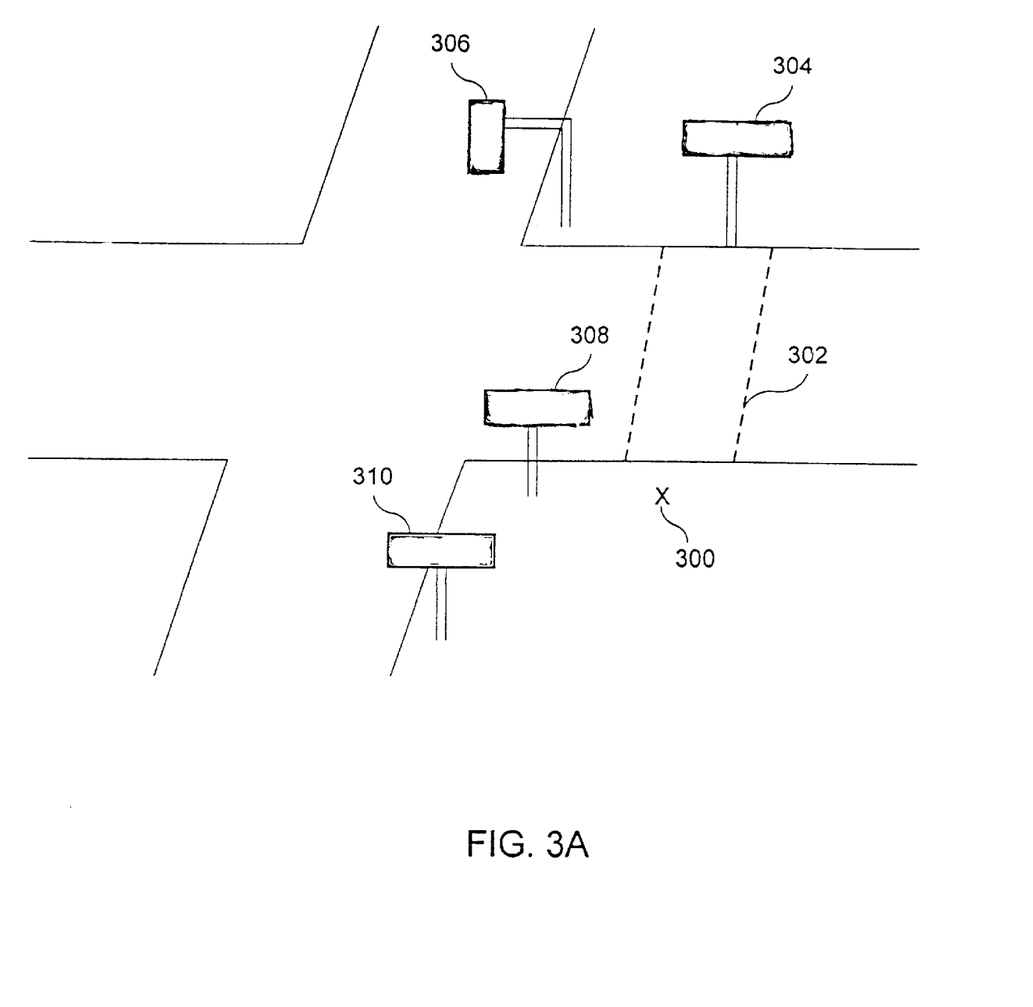
FIGS. 3A to 3C illustrate an example using 3D images in a simulated training environment for training a person to cross a street.
Figure 3B:
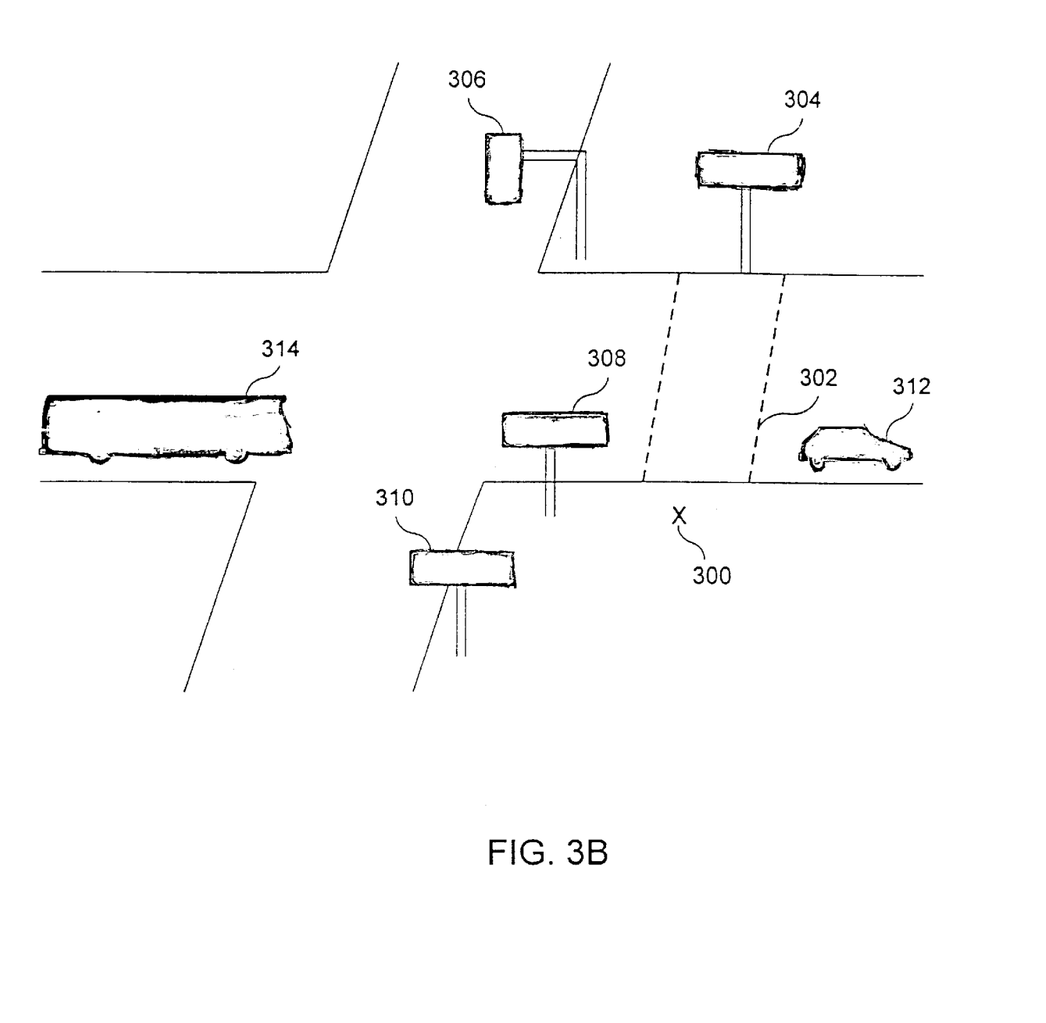
Figure 3C:
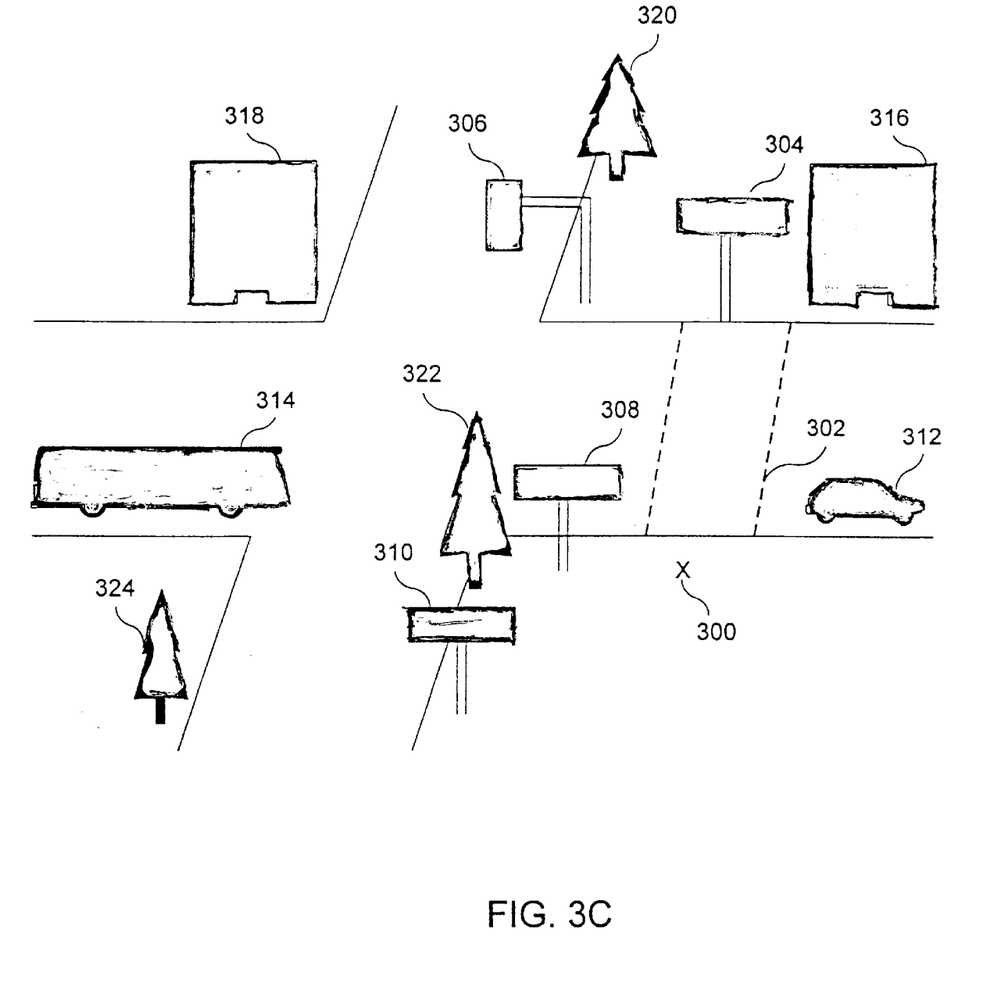

FIGS. 3A–3C illustrate an example of training a person to cross a street according to a preferred embodiment of the invention. These figures illustrate 3D views that would be seen by a trainee from position 300 through the virtual reality device during a typical training process.

As shown in FIG. 3A, the 3D street scene is presented to a trainee through the virtual reality device. In the figure, the trainee is standing at position 300 and will be trained to cross a street along a cross walk 302. In this 3D street scene, selected elements are presented to the trainee. These include pedestrian light 304, traffic light 306, street sign 308, and bus stop sing 310. Non-critical elements, such as buildings, trees, etc. are not displayed. In a preferred embodiment of the invention, these signs and lights will be initially shown to the trainee individually and then in combination. Once the trainee is familiar with these signs and lights and appreciates their implied meanings, additional elements will be added to the scene.

In FIG. 3B, moving vehicles are added to the scene. Specifically, a moving car 312 and a moving bus 314 are added to the street scene. In addition, sound may be generated to simulate the actual noises generated by the moving vehicles. At this stage, the trainee will be trained to act in accordance with the traffic rules. For instance, when pedestrian light 304 is green, he may cross the street; but if pedestrian light 304 is red, he must stop walking. Then he will be asked to cross the street when there are moving vehicles, and when the pedestrian light 304 is at different colors. The results of his performance are recorded. Each time he successfully crosses the street, a score will be recorded. Each time he is hit by a moving vehicle, a beep is generated to simulate the natural consequence of an accident. The fatigue of and attention by the trainee are continuously detected. If the brain wave signals of the trainee are in a predefined state, the trainee is probably too tired and the training will be temporarily terminated. If the brain wave signals of the trainee are acceptable, the training may continue.

In FIG. 3C, in addition to the elements in FIG. 3B, other non-critical elements including buildings 316, 318, and trees 320, 322, 324 are presented to the trainee. FIG. 3C essentially represents a complete simulated street scene. The trainee is again asked to cross the street. He will be trained to discriminate among various critical and non-critical elements and to take actions accordingly. After the trainee successfully completes the training process, a test will be given to him to analyze his ability to cross a street in a simulated environment. For example, he will be instructed to go to a grocery store which is several blocks away from his home and come back and/or he will be shown this performed successfully. If he successfully passes the test, then he has learned the skill. However, if he fails, the training process may be modified to accommodate the trainee's specific needs. The new training process may be presented to him, until he successfully learns to perform the task.

The present invention is useful for training a person to perform a cognitive/functional task in a simulated environment. The present invention is particularly applicable for rehabilitating brain-damaged persons who, after certain accidents, do not remember how to do many cognitive/functional tasks. The present invention also finds application in various other fields, e.g., in industrial training, etc.

While the invention has been described in conjunction with specific embodiments, it is evident that many alternatives, modifications and variations will be apparent to those skilled in the art in light of the foregoing description. Accordingly, it is intended to embrace all such alternative, modifications and variations as fall within the spirit and scope of the appended claims and equivalents.

What is claimed is:

1. A method of training a person to perform a cognitive/functional task, comprising the steps of:
   decomposing the cognitive/functional task into critical elements and non-critical elements, the critical elements having distinguishing features and being essential to the cognitive/functional task the distinguishing features having operative characteristics which demand a certain action on the part of the person;
   presenting the critical and non-critical elements in a predetermined sequence in a simulated environment;
   training the person to act in accordance with the critical and non-critical elements presented;
   monitoring actions taken by the person in the simulated environment in response to the presented critical and non-critical elements; and
   measuring learning of the cognitive/functional task by the person.

2. The method of claim 1, wherein the step of presenting includes the step of:
   presenting the critical elements separately and in combination; and
   presenting the critical and non-critical elements in combination.

3. The method of claim 1, wherein the step of measuring includes the step of measuring fatigue of and attention and learning achievement by the person by detecting brain wave signals of the person consistent with fatigue, with attention, and with learning achievement.

4. The method of claim 3, wherein if the brain wave signals are in low theta state, it indicates that the person has a low level of fatigue; wherein if the brain wave signals are in low alpha state, it indicates the person is paying attention; wherein if the brain signal is in accord with a predetermined learning achievement algorithm, it indicates that learning has been achieved.

5. The method of claim 1, further comprising the step of defining a training process having a predetermined complexity by presenting the critical and non-critical elements in a particular manner.

6. The method of claim 5, further comprising the step of modifying the training process to adapt to individual trainees.

7. The method of claim 1, further comprising the step of testing the person to perform the complete cognitive/functional task in the simulated environment.

8. A method of training a person to perform a cognitive/functional task, comprising the steps of:
   decomposing the cognitive/functional task into critical elements and non-critical elements, the critical elements having distinguishing features and being essential to the cognitive/functional task the distinguishing features having operative characteristics which demand a certain action on the part of the person;
   presenting the critical elements separately and in combination in a predetermined sequence in a simulated environment;
   presenting the non-critical elements in addition to the critical elements in a predetermined manner in the simulated environment;
   training the person to act in accordance with the critical and non-critical elements presented;
   monitoring actions taken by the person in the simulated environment in response to the presented critical and non-critical elements;
   measuring learning of the cognitive/functional tasks by the person by measuring fatigue of and attention by the person and learning achievement; and
   testing the person to perform the complete cognitive/functional task in the simulated environment.

9. The method of claim 8, wherein the step of measuring includes the step of detecting a brain wave signal of the person.

10. The method of claim 9, wherein if the brain wave signal in specific defined states, it indicates that the, person has a low level of fatigue and/or is paying attention, and/or learning achievement has been realized.

11. The method of claim 8, further comprising the step of defining a training process having a predetermined complexity by presenting the critical and non-critical elements in a particular manner.

12. The method of claim 11, further comprising the step of modifying the training process to adapt to individual trainees.

13. An apparatus for training a person to perform a cognitive/functional task, comprising:
    a first portion configured to decompose the cognitive/functional task into critical elements and non-critical elements, the critical elements having distinguishing features and being essential to the cognitive/functional task the distinguishing features having operative characteristics which demand a certain action on the part of the person;
    a second portion configured to present the critical and non-critical elements in a predetermined sequence in a simulated environment;
    a third portion configured to train the person to act in accordance with the critical and non-critical elements presented;
    a fourth portion configured to monitor actions taken by the person in the simulated environment in response to the presented critical and non-critical elements; and
    a fifth portion configured to measure learning achievement by the person.

14. The apparatus of claim 13, wherein the second portion includes:
    a first part configured to present the critical elements separately and in combination; and
    a second part configured to present the critical and non-critical elements in combination.

15. The apparatus of claim 13, wherein the fifth portion includes a part configured to measure fatigue of, attention by and learning achievement by the person by detecting a brain wave signal of the person.

16. The apparatus of claim 15, wherein if the brain wave signal is in specific defined states, it indicates that the person has a low level of fatigue and/or is paying attention, and/or learning achievement has been realized.

17. The apparatus of claim 13, further comprising a sixth portion configured to define a training process having a predetermined complexity by presenting the critical and non-critical elements in a particular manner.

18. The apparatus of claim 17, further comprising a seventh portion configured to modify the training process to adapt to individual trainees.

19. The apparatus of claim 13, further comprising a sixth portion configured to test the person to perform the complete cognitive/functional task in the simulated environment.

20. The apparatus of claim 13, wherein the second portion includes a virtual reality device.

21. The apparatus of claim 13, wherein the fifth portion includes a brain wave signal detection device.

* * * * *